United States Patent
Goldstein et al.

(10) Patent No.: US 6,426,121 B1
(45) Date of Patent: Jul. 30, 2002

(54) DUAL CROSSLINKABLE EMULSION POLYMERS AT AMBIENT CONDITIONS

(75) Inventors: Joel Erwin Goldstein, Allentown; Ronald Joseph Pangrazi, Fleetwod, both of PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

(21) Appl. No.: 09/816,305

(22) Filed: Mar. 23, 2001

Related U.S. Application Data

(63) Continuation-in-part of application No. 09/690,247, filed on Oct. 17, 2000, now abandoned.

(51) Int. Cl.$^7$ ................................ B05D 3/02
(52) U.S. Cl. ............... 427/389.8; 427/389.9; 427/391; 427/392; 427/393.5
(58) Field of Search ............ 427/389.8, 389.9, 427/391, 392, 393.5

(56) References Cited

U.S. PATENT DOCUMENTS

| | | | |
|---|---|---|---|
| 3,806,498 A | 4/1974 | Wilson et al. | 260/94.2 R |
| 4,278,578 A | 7/1981 | Carpenter | 260/27 R |
| 4,605,698 A | 8/1986 | Briden | 524/559 |
| 4,645,789 A | 2/1987 | Dabi | 524/379 |
| 5,534,310 A | 7/1996 | Rokowski et al. | 427/494 |
| 6,117,492 A | 9/2000 | Goldstein et al. | 427/391 |

FOREIGN PATENT DOCUMENTS

JP 61-186598 * 8/1986

OTHER PUBLICATIONS

LeBel, et al, Tappii, 51(9), 1968, pp79A–84A, 1968.*

* cited by examiner

*Primary Examiner*—Erma Cameron
(74) *Attorney, Agent, or Firm*—Mary E. Bongiorno

(57) ABSTRACT

This invention relates to a dual crosslinkable polymer/crosslinking system particularly suited for use in preparing high quality nonwoven products. The polymeric binders incorporate at least two different but reactive functionalities, i.e., hydroxy and carboxyl, and which are capable of reacting with two other multifunctional reactants, i.e., polyaldehydes and aziridines, each of which reacts with at least one of the functionalities present in the polymer. This selection of reactive functionality coupled with the selection of crosslinking agents permits ambient temperature cure.

15 Claims, No Drawings

DUAL CROSSLINKABLE EMULSION POLYMERS AT AMBIENT CONDITIONS

This is a continuation in part of application Ser. No. 09/690,247 filed Oct. 17, 2000 now abandoned.

BACKGROUND OF THE INVENTION

Crosslinking systems for effecting cure of emulsion polymers are used to provide nonwoven articles, particularly cellulosic webs such as paper towels, with some desired property such as water or solvent resistance. Most crosslinking systems for emulsion polymers which are employed today require temperatures in excess of 100° C. to ensure the development of a decently cured system. While high temperature cures may be acceptable for many applications, such temperatures may be unacceptable in other applications because of an unsuitability of certain types of substrates, operational difficulties, and lastly, they may represent economic hardship due to the high cost of energy.

Many ambient crosslinking technologies for nonwoven articles have been investigated and are employed within some application niches. However, none are widely used today perhaps due to cost, inefficient cures or some chemical incompatibilities. These systems include the crosslinking of an acetoacetoxyethyl methacrylate (AAEM) containing polymer with a multi-primary amine functional moiety. This combination has a very short pot-life making it unsuitable for a one-part system without the addition of some blocking agent. Typically the use of blocking agents requires either temperature to activate the reactants or a pH change thereby reducing their applicability for many applications.

Epoxy functional co-monomers such as glycidyl methacrylate and allyl glycidyl ether have been evaluated, however the epoxy group is readily subject to hydrolysis in water to be of practical use in emulsion polymerizations.

The following patents are representative of crosslink chemistries for the crosslinking of polymeric emulsions.

U.S. Pat. No. 5,534,310 discloses a method for improving adhesive durable coatings on weathered substrates. The durable coatings are based upon latex binders formed by the polymerization of acrylic and methacrylic esters, such as methyl methacrylate, ethyl acrylate, butyl acrylate, 2-ethylhexyl acrylate, etc., along with vinyl monomers and the like. Durability is enhanced by incorporating acetoacetate functionality into the polymer, typically by polymerization of monomers such as acetoacetoxyethyl methacrylate, acetoacetoxyethyl acrylate (AAEA), allyl acetoacetate, and vinyl acetoacetate. Enamine functionality is incorporated into the polymer for improving adhesion by reaction of the latex containing the acetoacetate functionality with ammonia or an amine.

U.S. Pat. No. 4,645,789 discloses the use of highly crosslinked polyelectrolytes for use in diapers and dressings which are based upon acrylic acid-acrylate copolymers, acrylic acid-acrylamide copolymers, acrylic acid and vinyl acetate copolymers, and so forth. Preferred aziridines include the triaziridines based upon trimethylolpropane tripropionates, tris(1-aziridinyl)phosphine oxide, and tris(1-aziridinyl)-phosphine sulfide.

U.S. Pat. No. 4,605,698 discloses the use of polyfunctional aziridines in crosslinking applications. One type of polyaziridine is based upon the reaction of ethylene imine with acrylates of an alkoxylated trimethylolpropane or other polyol. Vinyl acetate/carboxylated urethanes and styrene/acrylics are shown as being crosslinked with polyfunctional aziridines to produce coatings having a low temperature crosslinking functionality.

U.S. Pat. No. 4,278,578 discloses coating compositions for plastic substrates based upon carboxy functional acrylic copolymers, which are crosslinked with from about 0.2 to 3% of a polyfunctional aziridine. Examples include N-aminoethyl-N-aziridylethylamine with a most preferred aziridine being a trifunctional aziridine having equivalent weight of 156 atomic mass units U.S. Pat. No. 3,806,498 discloses the use of (1-aziridinyl) alkyl curing agents for acid-terminated polymers. A wide variety of polymers having terminal-free acid groups are described as being crosslinkable through the use of the (1-aziridinyl)alkyl curing agents, and these include those formed by the reaction of esters of carboxylic saturated and unsaturated acids with aziridinyl alcohols.

U.S. Pat. No. 6,117,492 discloses emulsion polymers utilizing a dual crosslinking package which contains a moiety with an active methylene group. This group is reactable with dialdehydes, while the other functionality is a carboxylic acid, which is reactable with the tri-aziridine. The active methylene group was derived form acetoacetate.

BRIEF SUMMARY OF THE INVENTION

The invention relates to improved crosslinking system comprised of crosslinkable polymer and multiple crosslinking agents which are capable of reaching full cure under ambient conditions. More particularly the invention relates to an improved process for forming a nonwoven web bonded with a dual crosslinkable polymeric emulsion wherein a polymeric emulsion is applied to the nonwoven web, the water removed, and the crosslinkable polymer subsequently crosslinked. The improvement comprises:

utilizing a polymeric emulsion wherein the crosslinkable polymer has pendent carboxylic acid functionality and is formed in the presence of poly(vinyl alcohol) stabilizing functionality;

crosslinking the hydroxyl functionality in the crosslinkable polymer by reaction with an effective amount of a polyaldehyde; and, crosslinking the carboxylic acid functionality by reaction with an effective amount of a polyaziridine compound.

There are numerous advantages of the dual crosslinker system described herein; these advantages include:

an ability to from a polymer that can achieve >90% of total cure in the test conditions, typically either 150° F. for two minutes or 200° F. for 90 seconds;

an ability to achieve a degree of cure sufficient to approach the target performance requirements as currently achieved by a thermally activated system based on aminoplast technology; and, an ability to provide for a formulation which is eminently workable at the site of use.

DETAILED DESCRIPTION OF THE INVENTION

In practicing the invention for producing nonwoven webs incorporating crosslinkable polymeric systems capable of reaching full cure under ambient conditions, ethylenically unsaturated monomers wherein at least one has pendent carboxyl groups are polymerized in the presence of poly (vinyl alcohol) protective colloid. Thus, the resultant polymers provide for at least two mechanisms for crosslinking. Crosslinking of the hydroxyl functionality sites is effected by reaction with a polyfunctional hydroxyl reactive compound, i.e., a polyfunctional aldehyde and crosslinking of the acid sites is effected by reaction with a polyfunctional aziridine.

The nonwoven web can be a cellulosic web, such as pulp, or a synthetic fiber based web, such as a polyester (e.g., polyethylene terephthalate), a polyolefin (e.g., polypropylene), a polyamide (e.g., nylon), and fiberglass. The nonwoven substrate can also be a blend of synthetic fibers, or a blend of synthetic fibers with non-synthetic fibers, such as cellulosic fibers.

The poly(vinyl alcohols) suited for forming dual crosslinkable emulsion polymers is related to the type of monomers being polymerized. Polymer systems employing vinyl acetate may use poly(vinyl alcohols) having a molar hydrolysis values of about 85% and above. Fully hydrolyzed poly(vinyl alcohols) may be used but may affect viscosity and stability.

The production of all acrylic emulsions presents a different problem. One of the keys to producing a high solids, e.g., greater than 45% by weight all acrylic emulsion without the use of surfactants, solubilizers, and microfluidization techniques resides in the use of a poly(vinyl alcohol) selected from the group consisting of substantially fully hydrolyzed poly(vinyl alcohol) and a partially hydrolyzed poly(vinyl alcohol), >86%, as the stabilizing agent where the number average molecular weight ranges from about 5,000 to 13,000. A preferred type is one having a molar hydrolysis value of at least 96.5%, i.e., 96.5% of the acetate groups in poly(vinyl acetate) are converted to hydroxyl groups. When less than 96.5% of the acetate groups are converted to hydroxyl groups, i.e., the polyvinyl acetate is less than fully hydrolyzed, and the molecular weight is above about 13,000, there is a tendency for a high solids acrylic emulsion formulation to become gritty. As the degree of hydrolysis is reduced substantially below 96.5%, the latex may become unstable. The second type of poly(vinyl alcohol), as stated, is a poly(vinyl alcohol) having a hydrolysis value of at least 86% to fully hydrolyzed and a number average molecular weight within a range of from 5,000 to 13,000.

Blends of fully hydrolyzed poly(vinyl alcohols) may be used with favorable results. One type of blend comprises from 20 to 80%, preferably 50 to 75%, of a low molecular weight (5,000 to 13,000) poly(vinyl alcohol), including 86 to 90% hydrolyzed, and 20 to 80%, preferably 50 to 75%, of a higher molecular weight, e.g., 25,000 to 45,000 molecular weight poly(vinyl alcohol). Another blend may comprise a fully hydrolyzed poly(vinyl alcohol) and a partially hydrolyzed poly(vinyl alcohol) which by itself would have been unacceptable for stabilizing the emulsion. In other words, not all of the stabilizing poly(vinyl alcohol) need be fully hydrolyzed but may contain some lower hydrolyzed material, e.g., a hydrolysis value of from 85 to 90% at a molecular weight greater than 15,000. If some lower hydrolysis material is employed, the level should be monitored closely as the all acrylic emulsion will become less stable. One may use from about 0 to 25% of such lower hydrolysis poly(vinyl alcohol) but the remainder of the poly(vinyl alcohol) should have a hydrolysis value of at least 98% as the other component of the stabilizer. The ratio of partially hydrolyzed polyvinyl alcohol to fully hydrolyzed poly(vinyl alcohol) does not impact stability but does not impact viscosity and water resistance of the finished web.

The level of poly(vinyl alcohol) utilized as a stabilizer is from about 2 to 12%, preferably from about 3 to about 8% based on the weight of the total monomers to be polymerized.

In forming emulsion polymers having dual crosslink functionality, the operative level for the carboxylic acid functionality in the polymer typically is from 1–10 weight percent carboxyl functionality based upon the total weight of the polymer.(for monomers other than acrylic acid carboxylic acid functionality is measured relative to the molecular weight of acrylic acid.) Preferably, the carboxylic acid containing comonomer is incorporated into the polymer in a preferred percentage range from 3–6% by weight.

The ethylenically unsaturated monomers which can be polymerized to form dual crosslinkable polymeric emulsions include $C_{1-13}$ alkyl esters of acrylic and methacrylic acid, preferably $C_{1-8}$ alkyl esters of (meth)acrylic acid, which include methyl methacrylate, ethyl acrylate, butyl acrylate, hexyl acrylate, 2-ethylhexyl acrylate, isooctyl acrylate, isodecyl acrylate and the like; vinyl esters such as vinyl acetate and vinyl propionate; vinyl chloride, acrylonitrile; hydrocarbons such as ethylene, butadiene, styrene, etc.; mono and diesters of maleic acid or fumaric acid, the mono and diesters being formed by the reaction of maleic acid or fumaric acid with a $C_{1-13}$ alkanol, preferably a $C_{8-13}$ alkanol such as, n-octyl alcohol, i-octyl alcohol, butyl alcohol, isobutyl alcohol, methyl alcohol, amyl alcohol (dibutyl maleate is preferred); $C_{1-8}$ alkyl vinyl ethers such as methyl vinyl ether, ethyl vinyl ether, isopropyl vinyl ether, n-propyl vinyl ether, tert-butyl vinyl ether and n- and isobutyl vinyl ether and vinyl esters can also be employed. Also, vinyl esters of $C_{8-13}$ neo-acids which are comprised of a single vinyl ester or mixture of tri- and tetramers which have been converted to the corresponding single or mixture of $C_{8-13}$ neo-acids may be polymerized. Preferred polymer systems for nonwoven web applications are vinyl acetate/ethylene based although all acrylic systems may be used.

Hydroxyl functionality may be incorporated into the polymer through the use of hydroxy functional acrylates. Typically only a portion, e.g., less than 10% by weight based upon total monomer employed in producing the polymerized product is provided by this mechanism. The use of poly (vinyl alcohol) is preferred as discussed earlier. Hydroxy functional monomers include hydroxy propyl acrylate, and so forth.

Carboxy functional monomers employed in the polymerization to provide pendent carboxyl groups are alpha, beta-ethylenically unsaturated $C_{3-10}$, preferably $C_{3-6}$, carboxylic acids. Specific examples include (meth)acrylic acid, maleic acid, crotonic, itaconic acid, carboxyethyl acrylate and so forth. Alternatively, monomers capable of conversion to carboxy functionality may be used. Maleic anhydride is an example of a monomer convertible to one having carboxyl groups. However, a preferred acid is acrylic acid.

In producing the relatively ambient temperature dual crosslinkable polymer, the polymer should incorporate from about 2 to 12% preferably 3 to 8% by weight of the hydroxyl functionality relative to the molecular weight of polyvinyl alcohol (at least 87% hydrolyzed.

Representative vinyl acetate based and acrylic based compositions are set forth in the following table. Preferred emulsion polymers are vinyl acetate based.

| Monomer | Broad wt % | Preferred wt % |
| --- | --- | --- |
| Vinyl Acetate | 0–90 | 35–85 |
| (Meth)Acrylic Acid | 1–10 | 3–6 |
| Poly(vinyl alcohol) | 2–12 | 3–8 |
| $C_{1-8}$ alkyl (Meth)Acrylic Ester | 0–90 | 0 |
| Ethylene* | 0–50 | 15–30 |

*Ethylene is often used in place of acrylic esters. The sum of the monomer percent must equal 100%.

The polymers should have a Tg of from about −5 to +10° C. and, typically, an Mn of from 7,500 to 20,000.

Polymerization can be initiated by thermal initiators or by a redox system. A thermal initiator is preferred at temperatures at or above about 70° C. and redox systems are preferred when the polymerization temperature is below about 70° C. is used. The viscoelastic properties are influenced by small changes in temperature and by initiator composition and concentration. The amount of thermal initiator used in the process is 0.1 to 3 wt %, preferably from 0.5 to 1.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. The oxidizing agent can include, persulfates, azo compounds, and the like.

The reaction time will also vary depending upon other variables such as the temperature, the catalyst, and the desired extent of the polymerization. It is generally desirable to continue the reaction until less than 0.5% of the vinyl ester remains unreacted. Under these circumstances, a reaction time of about 6 hours has been found to be generally sufficient for complete polymerization, but reaction times ranging from 2 to 10 hours have been used, and other reaction times can be employed, if desired.

Crosslinking of the polymer having hydroxyl functionality and carboxyl functionality is achieved by reaction with at least two multifunctional reactants one capable of reacting with the hydroxyl functionality and the other with the carboxyl functionality. One of the multifunctional components is a polyaldehyde, and preferably a dialdehyde; the other multifunctional component is a polyaziridine. The operative level of each is controlled such that generally at least an effective amount or a stoichiometric amount is added to react with the hydroxyl and carboxyl functionality of the polymer and effect dual crosslinking. To drive the reaction to completion in a short time as required on the production line, an excess of one of the reactants is employed. In crosslinking, one end of the dialdehyde can react with the hydroxy functionality on the substrate, e.g. a diol group of cellulose and the other with the hydroxyl group of the poly(vinyl alcohol) which has been incorporated in the polymer. Examples of aldehydes suited for crosslinking include glutaraldehyde and glyoxal. If glyoxal is used, it typically is added at a level of from about 25 to 125, preferably from 50 to 100 mole percent, of the hydroxyl functionality.

With regard to the polyaldehyde, one example is a dialdehyde such as glyoxal or glutaraldehyde. One of the aldehyde functionalities of this chemical will react with the adjacent hydroxy groups of a polyhydroxy moiety to form two new covalent bonds. The other aldehyde group can react with two adjacent hydroxy groups of another poly(vinyl) alcohol containing chain or it could react with some functionality on the substrate, such as the diol group of cellulose resulting in a similar cyclic acetal linkage. Either way the polymer will be crosslinked to provide the finished material with water resistance or another desired application property.

There are numerous polyfunctional aziridinyl compositions that can be used for effecting crosslinking of the polymers containing pendent carboxyl functionality. Representative of polyfunctional aziridines are noted in U.S. Pat. Nos. 4,278,578 and 4,605,698 and are incorporated by reference. Typically these polyfunctional aziridine crosslinking agents are aziridine compounds having from 3 to 5 nitrogen atoms per molecule and N-(aminoalkyl) aziridines such as N-aminoethyl-N-aziridilethylamine, N,N-bis-2-aminopropyl-N-aziridilethylamine, N-3,6,9-triazanonylaziridine and the trifunctional aziridine crosslinker sold under the trademark Neocryl CX100. Other examples include bis and tris aziridines of di and tri acrylates of alkoxylated polyols, such as the trisaziridine of the triacrylate of the adduct of glycerine and 3.8 moles of propylene oxide; the tris aziridine of the triacrylate of the adduct of trimethylolpropone and 3 moles ethylene oxide and the tris aziridine of the triacrylate of the adduct of pentaerythritol and 4.7 moles of propylene oxide.

The dual crosslink feature of the polymer is important to achieve significant cure within an appropriate ambient cure temperature range from 20 to 40° C. In effecting cure, the conditions are controlled to flash the water from the emulsion and then effect cure. Water may be flashed at a temperature from 60 to 80° C. under ambient and reduced pressure and the product removed from the heat source and cure being affected without further addition of heat. The polymer typically cures within seconds.

Although not intending to be bound by theory, a combination of more than one cure chemistry allows the preparation of a system which gives a stable formulation for pot life and which meets the target performance requirements. Many other techniques used in the background art are difficult to translate to water-borne systems, the levels of expensive crosslinker are difficult to incorporate in an effective method and the formulations have limited pot life. The combination of these two methods of crosslinking a polymer allows less of each type of crosslinker to be employed. The methods do not interfere with each other and the level of neither exceeds that which contributes to instability. While the level of each crosslinker it self is insufficient to reach the target performance levels, in combination targets are achieved.

The following examples are provided to illustrate preferred examples of the invention and are not intended to restrict the scope thereof. For ease of calculation, it is assumed that the monomer reactants are present in the polymer in the same weight

EXAMPLE 1

Preparation of Vinyl Acetate/Ethylene/Acrylic Acid Polymer in the Presence of Poly(Vinyl Alcohol)

To a one gallon pressure reactor is charged 600 g of deionized water, 450.9 g of a 10% aqueous solution of Airvol 523 poly(vinyl alcohol), 37.5 g of an 80% aqueous solution of a secondary alcohol ethoxylate, 1.5 g of a 150% aqueous solution of phosphoric acid, 4.8 g of a 1% aqueous solution of ferric ammonium sulfate and 1500 g of vinyl acetate. The reactor is purged with nitrogen, agitated to 900 rpm and 500 g of ethylene is charged into the reactor. The temperature is adjusted to 30° C.

A delay of a solution of 1% aqueous t-bhp is started at 0.4 ml/min and a delay of a 10% aqueous solution of sodium formaldehyde sulfoxylate is started at 0.5 ml/min. Five minutes after the initiation of the reaction, 375 g of a delay of acrylic acid in vinyl acetate (118.5 g of acrylic acid in 319.0 g of vinyl acetate) is begun at 1.5 ml/min. The temperature is ramped up to 55° C. over an hour. An additional 50.0 g of ethylene is added over the course of the monomer delay, which takes a total of four hours to complete.

The residual vinyl acetate is converted using a 7% aqueous solution of t-bhp. The reaction is allowed to cool. The solids are 57.6% with a viscosity of 790 cps at 60 rpm with a number 3 LV spindle. The $T_g$ of the polymer is −7.6° C.

EXAMPLE 2

Dual Crosslinking of Vinyl Acetate/Ethylene/Acrylic Acid Polymer

To 100 g of this emulsion 45.1 g of deionized water is added. Then 7.5 g of glyoxal (a 40% aqueous solution)

followed by addition of 1.5 g of CX-100 (100% active). This formulation is then ready to be printed onto a nonwoven basestock. Upon printing, the nonwoven web is placed into an oven at 150° F. for two minutes to remove all the water. This formulation provides tensile performance to the nonwoven basestock similar to that achieved by standard heat activated systems based upon N-methylol acrylamide for example which do not provide any tensile performance under similar drying conditions.

EXAMPLE 3

Preparation of Acrylic Ester/Acrylic Acid Polymer in the Presence of Poly(Vinyl Alcohol)

Another example of an emulsion system to that of Example 1 is one where the polymer backbone is acrylic. A 2L reactor is charged with 346.0 g of deionized water, 265.8 g of a 10% aqueous solution of Airvol 205 poly(vinyl alcohol), 88.0 g of a 10% aqueous solution of Airvol 502 poly(vinyl alcohol), 1.6 g of acetic acid, 1.1 of 70% t-bhp, 2.5 g of a 1% aqueous solution of ferric ammonium sulfate, and 217.0 g of a monomer pre-mix (743.1 g of ethyl acrylate, 254.7 g of methyl methacrylate, 50.0 g of methacrylic acid and 6.6 g of N-dodecyl mercaptan). The reactor is heated to 53° C. and the reaction initiated using a reducing delay of 5% sodium formaldehyde sulfoxylate at 0.35 ml/min and an oxidizing delay of 5% t-bhp at 0.3 ml/min. The temperature is ramped up to 80° C. over an hour, while the remaining monomer delay is added at 4.0 ml/min. The reaction is continued for one hour after all the monomers have been added and then allowed to cool. The $T_g$ of this polymer is 8.2° C., with solids of 49.1% and a viscosity of 394 cps.

EXAMPLE 4

Dual Crosslinking of Acrylic Ester/Acrylic Acid Polymer

The latex of Example 3 was diluted in similar manner to the emulsion polymer of Example 1 in Example 2. More specifically the emulsion was diluted to 20.0% solids and treated with 7.5 g of a 40% aqueous solution of glyoxal and 1.5 g of CX-100. Crosslinking was effected under Example 2 conditions.

Comparative Example 4

Single Crosslinkable Emulsion Polymer

The Example 1 polymers loaded with carboxylic acid functionality did not demonstrate any low temperature cure when treated with varying quantities of zirconium ammonium carbonate or the zinc equivalent. It did provide decent cures when heated. However, even when the acid functionality was repositioned away from the polymer backbone by using carboxyethyl acrylate as the source of the carboxylic acid group, that system still did not generate any appreciable level of low temperature cure with the heavy metal salts.
Summary Vinyl acetate based and all acrylic emulsions can be provided with room temperature cure properties via the dual crosslinkability function described. A single crosslinkable functionality whether it is based upon aziridinyl groups reacted with carboxyl or aldehyde groups reacted with hydroxyl is significantly less efficient.

What is claimed is:

1. In a process for forming a nonwoven web bonded with a polymeric emulsion containing a crosslinkable polymer wherein a polymeric emulsion is applied to the nonwoven web, the water removed, and the crosslinkable polymer subsequently crosslinked, the improvement which comprises:

utilizing a polymeric emulsion wherein the crosslinkable polymer is formed in the presence of poly(vinyl alcohol) and thereby incorporates hydroxyl functionality and, in addition thereto, incorporates pendent carboxylic acid functionality; and crosslinking the hydroxyl functionally in the crosslinkable polymer by reaction with an effective amount of a polyaldehyde, and, crosslinking the carboxylic acid functionality by reaction with an effective amount of a polyaziridine compound.

2. The process of claim 1 wherein the polyaldehyde employed for crosslinking the hydroxyl functionality in said crosslinkable polymer is a dialdehyde.

3. The process of claim 1 wherein the poly(vinyl alcohol) is present in said crosslinkable polymer in an amount of from 2 to 12% by weight of the crosslinkable polymer.

4. The process of claim 3 wherein the poly(vinyl alcohol) has a percent hydrolysis from 86 to 96.5 mole %.

5. The process of claim 2 wherein the dialdehyde is glyoxal or glutaraldehyde.

6. The process of claim 4 wherein the carboxyl functionality is present in said crosslinkable polymer in an amount of from 3–6% of total monomers by weight.

7. The process of claim 1 wherein the nonwoven web is a cellulosic web and the polymer is comprised of polymerized units of the following monomers and are polymerized in the following weight percentages:

| Monomer | Weight Percent |
| --- | --- |
| Vinyl Acetate | 0–90 |
| (Meth)Acrylic Acid | 1–10 |
| Poly(vinyl alcohol) | 2–12 |
| $C_{1-8}$ alkyl (Meth)Acrylic Ester | 0–90 |
| Ethylene | 0–50 | wherein the sum of the monomer percent is equal to 100%.

8. The process of claim 7 wherein the nonwoven web is a cellulosic web and the polymer is comprised of polymerized units of the following monomers and are polymerized in the following weight percentages:

| Monomer | Weight Percent |
| --- | --- |
| Vinyl Acetate | 35–85 |
| (Meth)Acrylic Acid | 3–6 |
| Poly(vinyl alcohol) | 3–8 |
| $C_{1-8}$ alkyl (Meth)Acrylic Ester | 0 |
| Ethylene | 15–30 | wherein the sum of the monomer percent must equal 100%.

9. The process of claim 8 wherein the dialdehyde is employed in an amount of from about 25 to 150 mole percent based upon hydroxyl functionality in the crosslinkable polymer.

10. The process of claim 8 wherein the polyaziridine compound is selected from the group consisting of N-aminoethyl-N-aziridilethylamine, N,N-bis-2-aminopropyl-N-aziridilethylamine, N-3,6,9-triazanonylaziridine, the bis and tris aziridines of di and tri acrylates of alkoxylated polyols, the trisaziridine of the triacrylate of the adduct of glycerine and propylene oxide, the trisaziridine of the triacrylate of the adduct of trimethylolpropane and ethylene oxide and the trisaziridine of the triacrylate of the adduct of pentaerythritol and propylene oxide.

11. The process of claim 9 wherein the number average molecular weight of the polymer is from 7500 to 20,000.

12. The process of claim 1 wherein the nonwoven web is a synthetic fiber based web, wherein synthetic fibers are optionally blended with cellulosic fibers.

13. The process of claim 1 wherein the nonwoven web is a synthetic fiber based web comprising a polyester, a polyolefin, a polyamide, or blends thereof.

14. The process of claim 1 wherein the nonwoven web comprises fibers of polyethylene terephthalate, polypropylene, nylon, or fiberglass.

15. The process of claim 1 wherein the nonwoven web is a blend of cellulosic fibers with polyethylene terephthalate fibers, polypropylene fibers, nylon fibers, or fiberglass.

* * * * *